United States Patent [19]

Gilbreath

[11] 4,257,053
[45] Mar. 17, 1981

[54] HIGH-RESOLUTION LASER PLOTTER

[75] Inventor: Cecil R. Gilbreath, Houston, Tex.

[73] Assignee: Geosource, Inc., Houston, Tex.

[21] Appl. No.: 10,797

[22] Filed: Feb. 9, 1979

[51] Int. Cl.³ .................. G01D 9/42; G01D 15/10
[52] U.S. Cl. ............................ 346/108; 346/76 L
[58] Field of Search ........................ 346/76 L, 108

[56] References Cited

U.S. PATENT DOCUMENTS

| 3,389,403 | 6/1968 | Cottingham et al. | 346/76 L |
|---|---|---|---|
| 3,441,949 | 4/1969 | Rolon | 346/108 |
| 3,701,999 | 10/1972 | Congleton et al. | 346/76 L |
| 3,720,785 | 3/1973 | Van Auken | 346/76 L X |
| 3,781,902 | 12/1973 | Shim et al. | 346/108 X |
| 3,809,806 | 5/1974 | Walker et al. | 346/108 X |
| 3,896,362 | 7/1975 | Street | 346/108 X |
| 3,973,825 | 8/1976 | Starkweather | |
| 3,974,507 | 8/1976 | Chemalli et al. | 346/76 L |
| 4,001,840 | 1/1977 | Becker et al. | 346/76 L |
| 4,002,829 | 1/1977 | Hutchison | 346/76 L X |
| 4,002,830 | 1/1977 | Brown et al. | |
| 4,003,626 | 1/1977 | Reinke et al. | |
| 4,030,806 | 6/1977 | Goshima et al. | |
| 4,037,231 | 7/1977 | Broyles et al. | 346/108 |
| 4,040,737 | 8/1977 | Masaki et al. | 346/108 X |
| 4,044,363 | 8/1977 | Morgan | 346/108 X |
| 4,059,833 | 11/1977 | Kitamura et al. | 346/108 |
| 4,060,323 | 11/1977 | Hirayama et al. | 346/76 L |
| 4,067,021 | 1/1978 | Baylis et al. | 346/76 L |

OTHER PUBLICATIONS

Hopkins, R. E. et al., Optics for Laser Scanning, Optical Engineering, vol. 15, No. 2, Mar.-Apr. 1976, pp. 90-94.
Shreiber, W. F., Laser/Dry Silver Recorder, 53 Proceedings of the Society of Photo-Optical Instrumentation Engineers, 1975, pp. 116-121.
Bousky, S. et al., Laser Recording Performance with Spatial Error Compensation, 53 Proceedings of the Society of Photo-Optical Instrumentation Engineers, 1975, pp. 133-140.

Primary Examiner—George H. Miller, Jr.
Attorney, Agent, or Firm—Arnold, White & Durkee

[57] ABSTRACT

A high-resolution laser graphics plotter for plotting data on a recording medium as selectively positioned spots (pixels) of variable intensity is disclosed. The intensity of a collimated laser beam is modulated in response to plotting data to produce a modulated light beam. The modulated light beam produces a spot on a light-sensitive film positioned in a flat field image plane. A multi-facet rotating mirror scans the modulated beam across the image plane. A flat field scan lens is positioned between the rotating mirror and the image plane to provide correction for the non-linear velocity of the beam as it is scanned across the image plane, and to provide a constant diffraction limited spot size for each spot plotted. A spot placement means is provided to generate the spot placement signal which cooperates with the plot data to modulate the laser beam. The spot placement means also provides error correction for the facet-to-facet and facet-to-axis errors in the rotating mirror to permit high resolution (500 spots per inch) plotting on wide format film. A micro-stepping motor assembly is provided to advance the film across the image plane.

37 Claims, 10 Drawing Figures

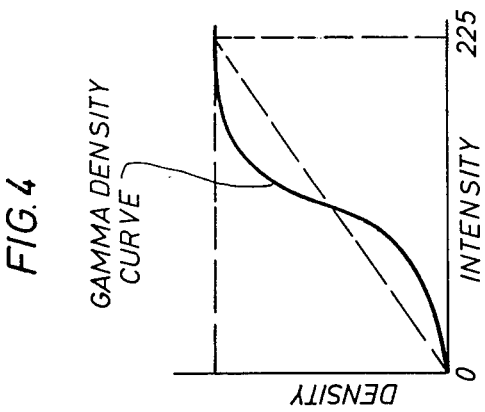
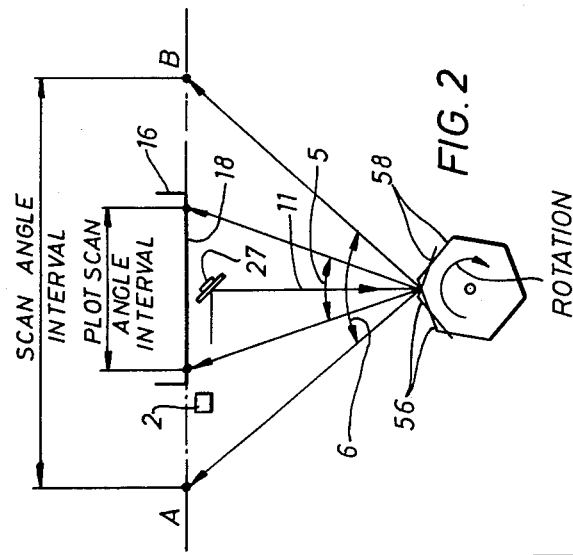
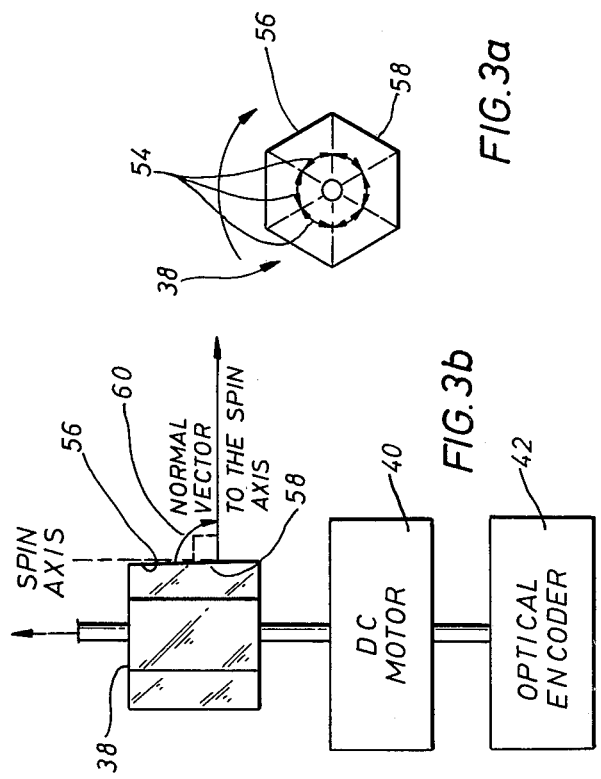
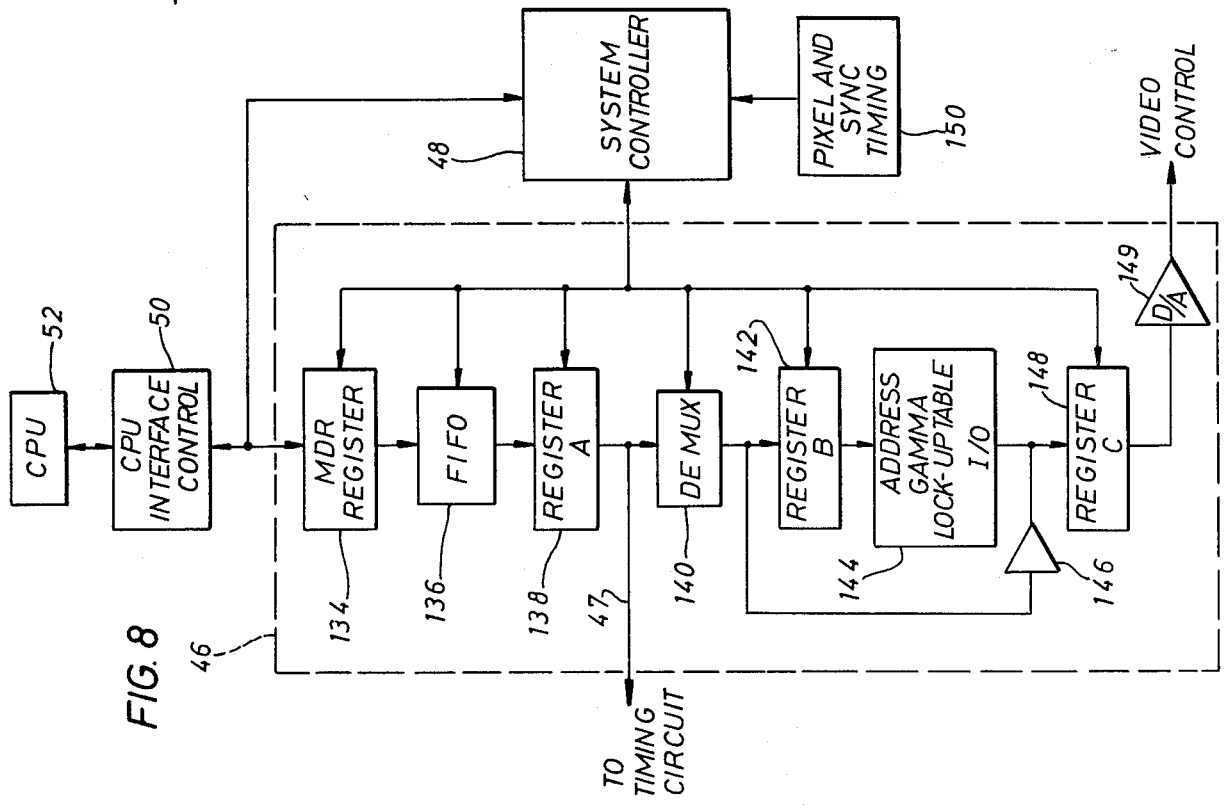

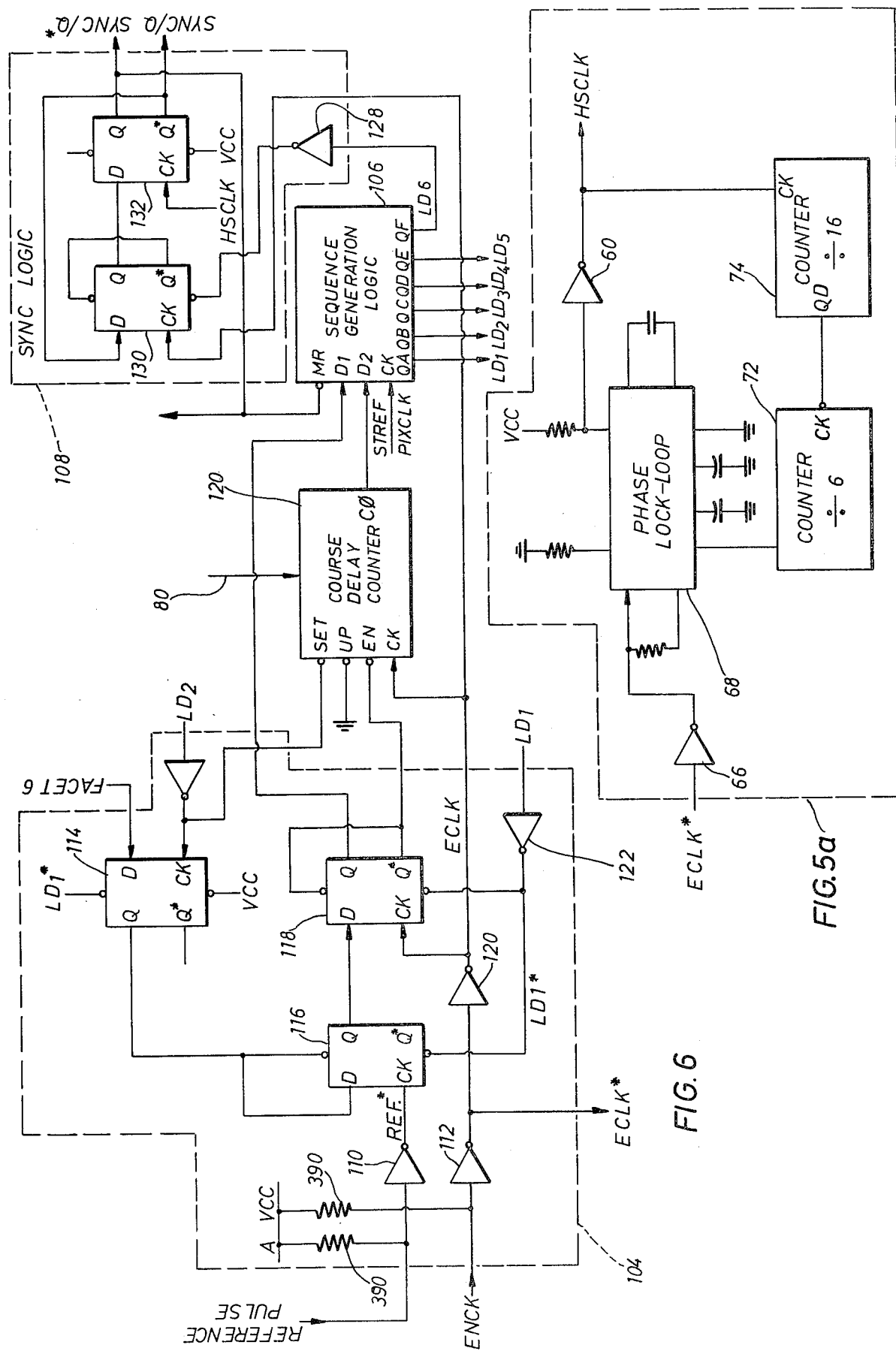

HIGH-RESOLUTION LASER PLOTTER

TABLE OF CONTENTS

BACKGROUND OF THE INVENTION
SUMMARY OF THE INVENTION
BRIEF DESCRIPTION OF THE DRAWINGS
DETAILED DESCRIPTION OF THE PREFERRED EMBODIMENTS
   THE PLOTTER AT THE FUNCTIONAL LEVEL
   THE SOURCE OF THE FACET-TO-FACET ERROR
   THE SOURCE OF THE FACET-TO-AXIS ERROR
   THE TIMING CIRCUITS AT THE FUNCTIONAL LEVEL
     Compensation for the facet-to-facet error
     Compensation for the facet-to-axis errors
     An Alternate Embodiment for Mirror Error Compensation
   THE VIDEO DATA CIRCUITS
   THE PLOTTER IN OPERATION
THE CLAIMS

BACKGROUND OF THE INVENTION

The present invention relates to plotting devices which produce plots using selectively positioned spots or dots on a recording surface. More particularly, the invention relates to high-resolution laser plotting (500 spots per inch) on a wide format light-sensitive film in which the selectively positioned spots are plotted in a raster format of consecutive scan lines across the film.

Wide format laser plotters which plot, in a raster format of consecutive scan lines, selectively positioned variable intensity spots or dots on light-sensitive film positioned for exposure in a flat field image plane are known in the prior art. These prior-art plotters have not been able to achieve high-resolution (up to 500 dots per inch both along the length and width of the film) plotting for various reasons. Specifically, major sources or errors in the construction of the rotating optical scanner, such as facet-to-facet and facet-to-spin axis errors, as well as problems in accurately controlling the advancement of the flim across the image plane, and achieving high modulation rates through the light beam intensity modulator, have prevented high-resolution plotting on wide format film.

Some of these prior-art laser plotting systems have used stepping motors as the primary motivating force for advancing the film across the image plane. For these prior-art plotters, at the completion of a plot scan line, the film and film advancing mechanism was moved by pulsing the stepping motor. At the completion of the required number of incremental steps to advance the film the specified line-to-line separation, the film handling assembly was commanded to stop. Because of high inertial forces, the ability of the stepping motor to start and stop the film handling assembly between the plotting of each scan line was not adequate to achieve accurate positioning of the film for the very small line-to-line spacing required between consecutive scan lines in high-resolution plotting. The prior-art plotters did not have a film handling assembly with a stepping motor of sufficient speed, resolution and torque to overcome the inertial forces in the film handling assembly to produce incremental steps small enough and accurate enough to achieve high-resolution plotting.

Plotting on a flat field image plane by scanning a modulated collimated laser beam across the image plane, whether by the prior art plotters or by the present invention, presents two problems. Both of these problems result from the use of a scanning device in which the total scan angle interval (interval subtended by the scanned beam as it is scanned across the image plane) is not small in comparison to the distance from the mirror to the image plane. That is, the radius of the scanned beam (the distance from the reflecting mirror facet to the image plane) is small in comparison of the scan interval. This relationship is necessitated by physical constraints of the plotter assembly itself. As a consequence, for wide format flat field plotting, the radius of the scanned beam varies considerably over the scanned image plane. This variation in beam radius produces the two problems.

First, to produce a given spot size at the image plane, the modulated laser beam is focused on the image plane to produce the desired spot size at the center of the scan angle interval. The beam diameter at that point is equal to the desired spot size. However, the depth of focus (the distance from the focused spot over which the focused beam diameter does not vary appreciably, and over which the spot is diffraction limited—the spot plotted has no rings) is small in comparison to the variation in the radius of the scanned beam. The depth o focus varies inversely to the plotting resolution and as the plot resolution increases, the depth of focus decreases. As a result, for high-resolution plotting, the spot size can vary appreciably over the scan angle interval, with the spots increasing in size near the ends of the scan line.

Second, for a constant angular rotation in the scanning mirror, the angular velocity of the beam measured at the image plane as the beam is scanned across the film is not constant. The velocity component at the image plane of the scanned beam varies non-linearly over the scan angle interval, with a higher velocity occuring at the two ends of the scan angle interval. This non-linear velocity of the image spot greatly complicates the timing to achieve exact spot placement as required for high-resolution plotting. The prior-art plotters have attempted to correct for these problems, but high-resolution plotting requires spot placement at smaller intervals than those of the prior art, and the prior-art correction means do not account for this angular velocity distortion to a sufficient degree of accuracy to permit high-resolution plotting.

Other problems present in the prior-art plotters which have prevented them from achieving high-resolution plotting capabilities result from inaccuracies which are inherent in the construction of the rotating mirror. These inaccuracies are not a limiting factor in the prior-art wide format plotters because they have limited the plotting resolution to resolutions at which these errors are not as significant (approximately 200 dots per inch at best). However, when the plotting resolution increases, these errors become significant. These errors are referred to as the facet-to-facet errors and the facet-to-spin axis (hereinafter facet-to-axis) errors which result in inaccuracies in the start of each scan line and in the scan line-to-scan line (hereinafter line-to-line) spacing, respectively.

Ordinarily, each facet of the multi-facet mirror should subtend a given angle measured at the axis of rotation, i.e. each facet should be the same size. Because of manufacturing tolerances, the angle subtended by each facet will vary. This variation is referred to as the facet-to-facet error. Also, the surface of each facet should be perpendicular to a normal to the sping axis vector. Again, because of manufacturing tolerances, the angle of the facet surface to the normal may not be the same for each fact. This variation is referred to as the facet-to-axis error.

Finally, wide format prior-art plotters have achieved a linear spot placement on the recording medium by timing the rotation of the scanning mirror to generate a spot placement signal that enables the plot data to modulate the intensity of the laser beam at the appropriate angular position of the mirror facet. This spot placement signal is produced by various methods, such as generating and counting a timing signal synchronized to the rotation of the mirror. This timing signal will have a frequency proportional to the angular velocity of the mirror, and indirectly, to the angular position of the mirror. In this manner, the prior-art devices could achieve reasonably linear placement of the spots adequate for low plotting resolutions. However, because of the extremely close spacing of the dots in high-resolution plotting, a resolution of the angular position of the rotating mirror to a degree of accuracy not achieved by the prior-art plotters is required.

Thus, such problems as accurate advancement of the film in very small increments to control the line-to-line spacing; maintaining a constant and diffraction limited spot size across the entire flat field image plane; compensating for the non-linear velocity of the beam as it is swept across the image plane; correcting for manufacturing tolerance errors in the multifacet scanning mirror, which errors appear as facet-to-facet and facet-to-axis errors; and resolving the angular position of the rotating mirror to a degree which permits the accurate placement of the spots have all combined to prevent the prior-art plotter from achieving high-resolution plots on wide format film.

SUMMARY OF THE INVENTION

In accordance with this invention, there is provided a laser graphics plotter which solves the problems present in the prior-art plotters to achieve high-resolution flat field plots on wide format film (up to 42 inches in width) as selectively positioned spots (pixels) of variable intensity. A collimated light source, such as a laser, generates a beam of light that ultimately will produce the spots on a light-sensitive film positioned for exposure in a flat field image plane. The collimated light beam is applied to a light intensity modulator that responds to the plot data to modulate the intensity of the collimated light beam. An optical assembly is provided between the collimated light source and the light intensity modulator to focus and reduce the beam diameter into the modulator to permit high modulation rates through the light intensity modulator. The modulted beam which exists the modulator enters a second optical assembly which recollimates and focuses the beam to produce the desired spot size on the image plane.

The modulated light beam is applied to a rotating multifacet mirror which scans the modulated light beam across the image plane of the film. Positioned between the rotating mirror and the image plane is a "flat field scan lens" which provides compensation for the non-linear velocity of the modulated light beam across the image plane, and also maintains a constant spot size for each spot plotted. Responsive to the rotation of the mirror, a spot positioning means generates a spot placement signal which cooperates with the plot data to produce the selectively positioned variable intensity spots of the plot. Included in the spot positioning means is a velocity sensitive tachometer that produces two signals, a timing signal and a reference signal. The timing signal is proportional to the angular velocity of the rotating mirror while the reference signal is a pulse produced once during each revolution of the mirror. The reference pulse is produced when the rotating mirror passes a reference position.

To achieve high-resolution plotting, manufacturing errors in the rotating mirror which produce errors in the start of each scan line and errors in the line-to-line spacing must be accounted for. An error correcting means is provided to perform this function. Included in the error correcting means is a frequency multiplier. The frequency multiplier multiplies the timing signal frequency by a predetermined number to obtain a high-speed clock signal that is phase-locked to the timing signal. This high speed clock provides the timing signal necessary to achieve the accuracy in the angular position determination of the rotating mirror to permit accurate high-resolution positioning of the spots.

Since the facet-to-facet and facet-to-axis errors vary from facet to facet, a control memory has been provided for storing control parameters which specify each facet's compensation parameters. A facet counter is provided to count each facet as it scans across the film. The contents of the facet counter correspond to one of the control memory addresses. The contents of the facet counter cooperates with a control memory address counter to provide the control memory with an address to output the control parameters which specify the necessary compensation to be applied.

To correct for the facet-to-facet errors, the angular position of each facet at which the reflected modulated light beam is positioned on the image plane at the start position of the scan lines must be located. This position is called the start plot position for each facet. To locate the start plot position, two counters, a coarse delay counter and a fine delay counter, are loaded with control parameters and are clocked by the timing signal and the high-speed clock, respectively. The results from the two delay counters is to divide each rotation of the rotating mirror into precisely determined intervals. The intervals correspond to the angular rotation from the start plot position of a facet to the start plot position of the next facet. The reference position signal generated each time the rotating mirror passes the reference point re-synchronizes the rotation of the mirror to the location of the start plot position of the facets. Because the angular rotation from start plot position to the next start plot position can accurately be determined, facet-to-facet manufacturing tolerances can be compensated for.

Correction for the facet-to-axis errors is achieved in two different ways. First, a step increment counter responsive to the timing signal and a control parameter produces a predetermined sequence of step increment pulses to a stepping motor to advance the film during a scan of the beam across the film (each step increment causing 10 micro-inches of film movement). Second, an offset voltage specified by a control parameter is applied to the light intensity modulator to deflect the modulated beam in a direction to increase or decrease the line-to-line spacing between consecutive scan lines. Thus, the line-to-line spacing may be controlled by a combination of both of these methods or by either one individually.

Additionally, the spot positioning means includes the film advancing means for advancing the light sensitive film across the image plane. This means is comprised of a stepping motor connected to a zero-backlash gear reducer. This combination produces a micro-incremental step in film advancement. This micro advancement in film position is required in high-resolution plotting in order to maintain the very small line-to-line spacing, and to minimize the dynamic response time and disturbances caused by moving a large mass very rapidly.

BRIEF DESCRIPTION OF THE DRAWINGS

For a fuller understanding of the nature and objects of the invention, reference should be had to the following detailed description taken in connection with the accompanying drawings, in which:

FIG. 2 is an illustration of the relationship between the scan angle interval and the plot scan angle produced by the rotating mirror;

FIG. 3(a) is a top view of the multi-facet mirror showing the angle subtended by each facet of the mirror which has tolerances that result in facet-to-facet errors;

FIG. 3(b) is a side view of the rotating mirror assembly illustrating the source of the facet-to-axis error;

FIG. 4 is a plot of the gamma density curve for the light-sensitive film;

FIG. 5(a) is a circuit diagram of the phase-locked loop frequency multiplier;

FIG. 6 is a circuit diagram of the facet coarse delay and bit sync circuits which locate the start plot position for each facet to a coarse resolution and generate the sequence signals for the timing circuits;

FIG. 8 is a block diagram of the video data circuits illustrated in FIG. 1.

Similar reference characters refer to similar parts throughout the several views of the drawings.

DETAILED DESCRIPTION OF THE PREFERRED EMBODIMENTS

It will be helpful in understanding the following discussion to define certain logic terms. Each of the logic signals to which reference is made in the following discussions will have one of two possible logic states, a logic 1 or a logic 0. A logic signal will be designated as a true signal without an astric following the mnemonic. As an example, CLOCK would be a true signal while CLOCK* would be its inverse. Each logic signal, be it the true signal or its inverse, will have an asserted and unasserted state. In the case of CLOCK, a ture signal, the asserted state will be a logic 1 and the unasserted state a logic 0. For CLOCK*, the reverse is true, the asserted state is logic 0 and the unasserted state is logic 1. A signal goes "true" when it switches from the unasserted to the asserted state and vice-versa when it goes "false". Lastly, a flip-flop is in a logic 0 state when the Q output is at a logic 0 and the Q* is at a logic 1. In the logic 1 state the outputs of the flip-flop are in their reverse states.

Furthermore, it should be noted that reference to specific component parts of specific manufacture are for the sake of example only and do not constitute limitations on the instant invention.

THE PLOTTER AT THE FUNCTIONAL LEVEL

Figure 1:
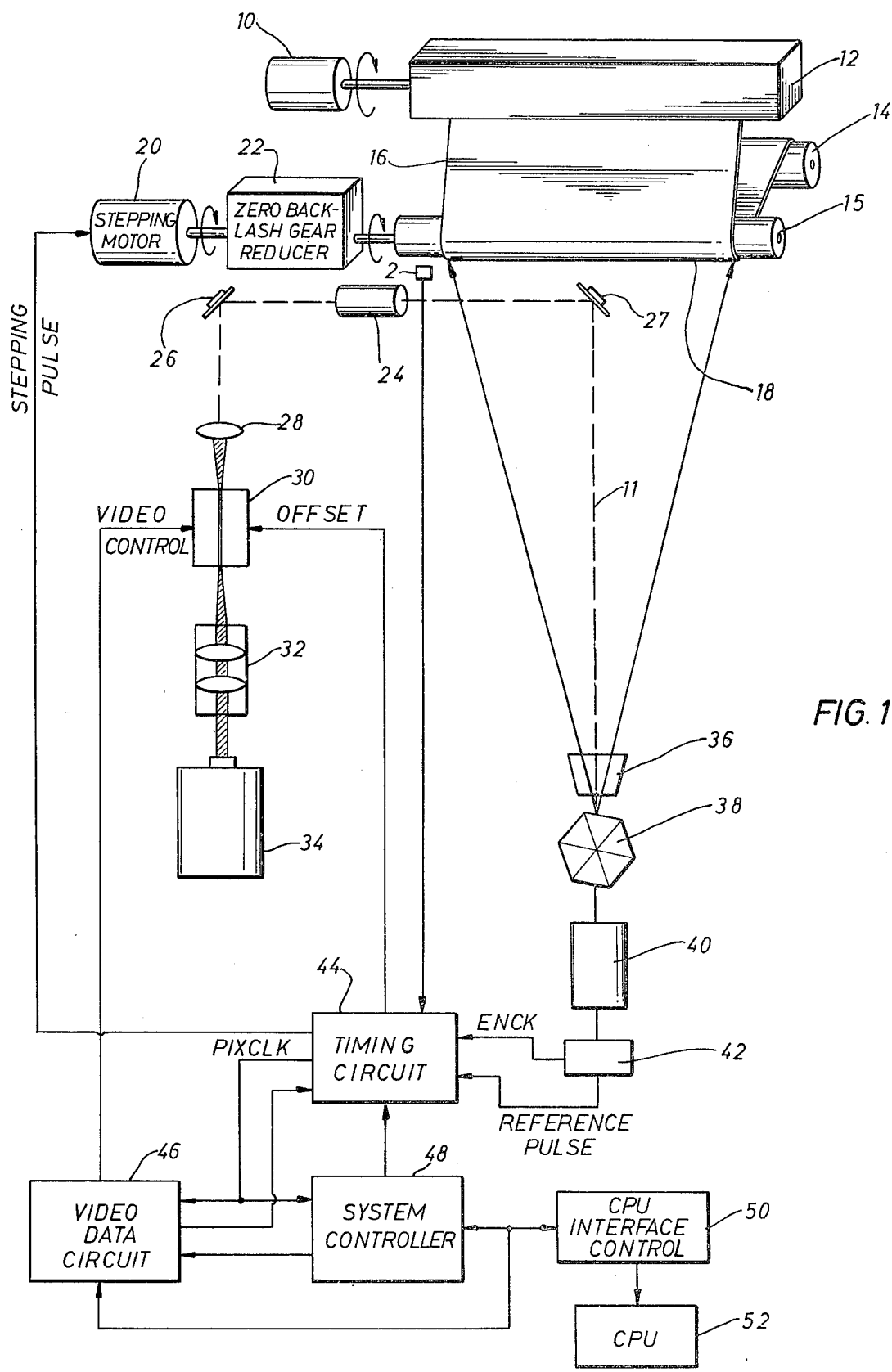
FIG. 1 is a block diagram of the high-resolution laser plotter.

Turning now to the figures and first to FIG. 1, a block diagram of the preferred embodiment of the present invention is illustrated. For this embodiment, a central processing unit (CPU) 52 is used to supply the plot data and the system commands to cause the high-resolution plotter herein described to produce its plots. For the preferred embodiment, a RDS 500 minicomputer manufactured by Ratheon Corporation is used for CPU 52. The CPU interface control circuitry 50, constructed according to standard interface procedures for this model of minicomputer, interfaces the CPU 52 to the internal circuits of the laser plotter. A system controller 48 responds to commands from the CPU 52 to initiate the plotting sequence. During that sequence, plot data from CPU 52 is supplied to the video data circuits 46 which in turn respond to the system controller 48. The video data circuitry 46 produce a video control signal in accordance with the plot data to modulate the laser beam to produce the variable intensity spots on the light-sensitive film. Standard films may be used for the light-sensitive film, such as wet process silver halide Kodak 2497 or its equivalent. However, films such as dry processed heat developed 3M Day Silver or its equivalent may also be used, in which case no chemicals or toners are required.

A multi-facet mirror 38, which for the preferred embodiment is a hexagonal or six-sided mirror, is rotated by a DC synchronous motor 40. For the preferred embodiment, the mirror is rotated at approximately 500 revolutions per minute. Attached to the shaft of the rotating mirror 38 is an incremental optical encoder 42 which produces a reference pulse REFERENCE PULSE and the timing signal ENCK that are used by timing circuits 44 to generate both the pixel placement timing pulses and the stepping pulses to the stepping motor 20. Stepping motor 20 is used as the motivating force to rotate platen drum 15.

Connected between platen drum 15 and stepping motor 20 is a zero-backlash gear reducer 22 which transforms the incremental steps in rotation of stepping motor 20 into microstep increments in rotation of platen drum 15. In this manner, very small and accurate incremental steps in rotation of platen drum 15 can be produced with present technology stepping motors. For the preferred embodiment, stepping motor 20 is Measur-Matic Electronics Corp. NP74-SSD-4-64. The zero-backlash gear reducer 22 is manufactured by the Illinois Tool Works, Inc., Spiroid Division as an 80:1 zero-backlash gear reducer. The stepping motor 20 in combination with its associated driver produces 12,800 steps per revolution operating at 96 RPM continuous duty. Responsive to that rate, the zero backlash gear reducer 22 produces an output of 1.2 RPM with a positional accuracy of better than 25 arc seconds and a resolution of 10 micro-inches per step increment. The positional accuracy of the output of the gear reducer 22 is related to the plotting accuracy of 500 lines per inch which equals 260 arc seconds of platen drum 15 rotation to achieve 2,000 micro-inches line-to-line spacing. With a line-to-line accuracy of ±10% for the preferred embodiment, a ±26 arc seconds absolute positional accuracy results. As is readily apparent, the stepping motor 20 and gear reducer 22 cooperate to produce a microincremental step in film advancement that is substantially smaller than the line-to-line spacing for a resolution of 500 lines per inch.

Passing over platen drum 15 is the light-sensitive film 16 on which the graphic plot is produced. The film 16 as it passes over the platen drum 15 forms a flat field image plane. The film 16 passes from the film spool magazine 14 over the platen drum 15 and into the film receiving magazine 12. A torque motor 10 provides a constant take-up torque to the film receiving magazine to keep the film in contact with the platen drum 15, but does not function to advance the film 16.

Still referring to FIG. 1, laser 34 produces a coherent collimated (all rays parallel) beam of light as the primary light beam source. This laser beam has a finite diameter. For the preferred embodiment, the laser is manufactured by AMERICAN LASER CORPORATION and sold as model 60A Ion Laser System. Model 60A radiates in the blue band in order to be compatible with the blue sensitive silver halide films of the preferred embodiment. The laser beam is applied to reducing optics 32 which focus the beam. At the focus point, a solid state acousto-optic modulator 30 is positioned. The acousto-optic modulator, such as model 1205-1-2 manufactured by Isomet Corporation, is positioned at the focus point of reducing optics 32 in order to achieve high-modulation rates with a good contrast ratio since the smaller the beam diameter through the modulator, the higher the modulation rate achievable for a given contrast ratio.

The acousto-optic modulator 30 has two voltage control inputs, the video control and the offset control. The video control is an analog voltage that is produced by the video data circuits 46 in accordance with the plot data. That is, the intensity of the laser beam as it leaves the acousto-optic modulator 30 may be varied in accordance with the video control voltage applied. For the preferred embodiment, the range of intensity over which the beam can be modulated is controlled by an 8-bit digital value. This permits intensity variations in 256 steps from the full "on" to the full "off" state. The acusto-optic modulator used in the preferred embodiment has a 1000:1 extinsion ratio. The offset control voltage operates to deflect the modulated beam at the flat field image plane 18 in a direction to increase or decrease the line-to-line spacing between consecutive scan lines.

As the laser beam leaves the acousto-optic modulator 30, its rays are in a diverging mode. The collimating optics 28 receive the diverging modulated laser beam to produce a second collimated beam which is applied to focus expander 24 by way of mirror 26. Focus expander 24 in combination with the flat field scan lens 36 focuses the collimated modulated laser beam to produce the required pixel (spot) diameter at the flat field image plane 18. The modulated and focused laser beam from focus expander 24 is applied to mirror 27 which reflects the beam through the center of a flat field scan lens 36 and onto the rotating multi-facet mirror 38. According to the angular position of the rotating mirror 38, the beam is reflected back through the flat field scan lens 36 and onto the flat field image plane 18.

For the arrangement illustrated in FIG. 1 in which the modulated laser beam 11 is reflected by mirror 27 into the center of the scan lens 36, it should be noted that mirror 27 is not located in the same plane as the scan line. Mirror 27 is located slightly below this plane. As a result, the line scanned across the image plane by the rotating mirror 38 having facets 90 degrees to the spin axix normal is not a straight line, but rather is slightly bowed. This distortion in the scan line is not noticable; however, it can be compensated for by using a mirror which has the appropriate facet-to-axis angle to account for the distortion. To avoid the problem altogether, mirror 27 may be deleted altogether, and mirror 26 and focus expander 24 repositioned to apply the modulated beam 11 into scan lens 36 at its edge rather than through its center. For this arrangement, the mirror 26 would be located in the same plane as the scan line. This arrangement may require a larger scan lens than that for the arrangement as illustrated in FIG. 1.

The timing circuits 44, responding to the timing signal ENCK and the REFERENCE PULSE produced by optical incremental encoder 42 generate the pixel placement signal PIXCLK that is applied to the video data circuits 46. The signal PIXCLK enables the plot data to produce the signal VIDEO CONTROL to the acousto-optic modulator 30. Although a CPU 52 is shown as the master control unit for producing the plot data, it is obvious to a person of ordinary skill in the art that other ways may be utilized to input the data to be plotted by the present invention, such as a digital tape unit having the plot data recorded thereon, read-only memories containing the plot data recorded therein, etc.

THE SOURCE OF THE FACET-TO-FACET ERROR

Referring to FIG. 2, various positions of two consecutive mirror facets 56 and 58 of mirror 38 are shown. Also illustrated is the scan angle interval and the plot scan angle resulting from the use of a multi-facet rotating mirror. These intervals subtend scan angle interval 6 and plot scan angle 5, respectively. For the preferred embodiment, in which a hexagonal mirror 38 positioned 51.18 inches from the image plane is used to sweep the modulated beam 11 (see FIG. 1) across a 42 inch wide format film the scan angle 6 is 60 degrees while the plot scan angle 5 is 26.25 degrees. The modulated laser beam 11 is applied to the rotating mirror such that when each facet is parallel to the image plane 18, all mirror errors being zero, the reflected beam from the mirror would strike the film 16 in the center of the image plane.

When the modulated laser beam 11 strikes facet 58 at its trailing edge, the laser beam is reflected to a point B as shown in FIG. 2. Further rotation of the mirror causes a portion of the modulated laser beam 11 which is now striking the leading edge of facet 56 to be reflected to a point A as shown in FIG. 2. However, the remaining portion of the modulated beam 11 is also being reflected to the point B. As the mirror continues to rotate, more of the laser beam 11 is reflected to point A than is reflected to point B. Eventually the mirror rotates to a point at which all of the light beam 11 is reflected to point A. Thus, the sequence of re-setting or re-sweeping the beam back to the start of the scan angle interval—moving the beam from points B to A—is completed. As the mirror facet 56 is rotated, the beam is swept across the scan angle interval. However, as can be seen, point A and point B do not correspond to the start and stop positions, respectively, for the plotted scan line of the film 16, the plot scan angle interval. During this mirror facet-to-facet transit time, the modulated laser beam is blanked having zero intensity.

At some point, facet 56 will have rotated into an angular position relative to the flat field image plane 18 such that the reflected modulated laser beam 11 from facet 56 will be at the starting position for plotting of the next scan line. This position is referred to as the start plot position for the facet. If the multi-facet mirror were perfect, the start plot position for each facet would occur at the same position on each facet. Stated differently, the start plot position for each facet would be in position to plot a scan line each time a fixed angular rotation of the mirror had occurred from the last start plot position. This fixed rotation would be determined by the number of facets in the rotating mirror 38. However, errors do exist in the construction of the mirror. As a result, the plot start position for each facet is not equally spaced around 360 degrees of rotation of the mirror 38.

The error in the construction of the rotating mirror 38 which produces an error in the start plot position is shown is FIG. 3(a). FIG. 3(a) illustrates a top view of the hexagonal or six-sided mirror 38 used in the preferred embodiment of the present invention. For this type of mirror, each facet forms a cord of a circle that subtends an angle 54 measured at the center of the mirror. Subtended angle 54 should be equal to exactly 60°. However, the subtended angle 54 is 60 degrees ± a manufacturing tolerance. This tolerance is referred to as the facet-to-facet error and results in a error in the starting position for each scan line if not corrected for. For high-resolution plotting, this facet-to-facet error must be accounted for even though these errors are very small, in the order of ±30 arc-seconds.

THE SOURCE OF THE FACET-TO-AXIS ERROR

In addition to the facet-to-facet errors which produce errors in the starting position for each scan line, another manufacturing tolerance error exists in the mirror 38. Referring now to FIG. 3(b), a side view of rotating mirror 38 showing facet 56 in an exaggerated inclined position relative to the normal vector to the mirror spin axis. If facet 56 were manufactured perfectly, the angle between the plane of the facet 56 and the normal vector to the spin axis would be 90°. However, manufacturing tolerances exist in this 90° angle. This error is referred to as the facet-to-axis error. The facet-to-axis errors produce variations in the line-to-line spacing between consecutive scan lines when the film is advanced the same distance for each scan line. Since the plotting resolution is specified both as a number of pixel spots per inch across the film and as the same number of scan lines per inch down the film, high-resolution plotting requires that the facet-to-axis errors be accounted for although these errors are typically only ±5 arc-seconds in magnitude.

THE TIMING CIRCUITS

Figure 5B:
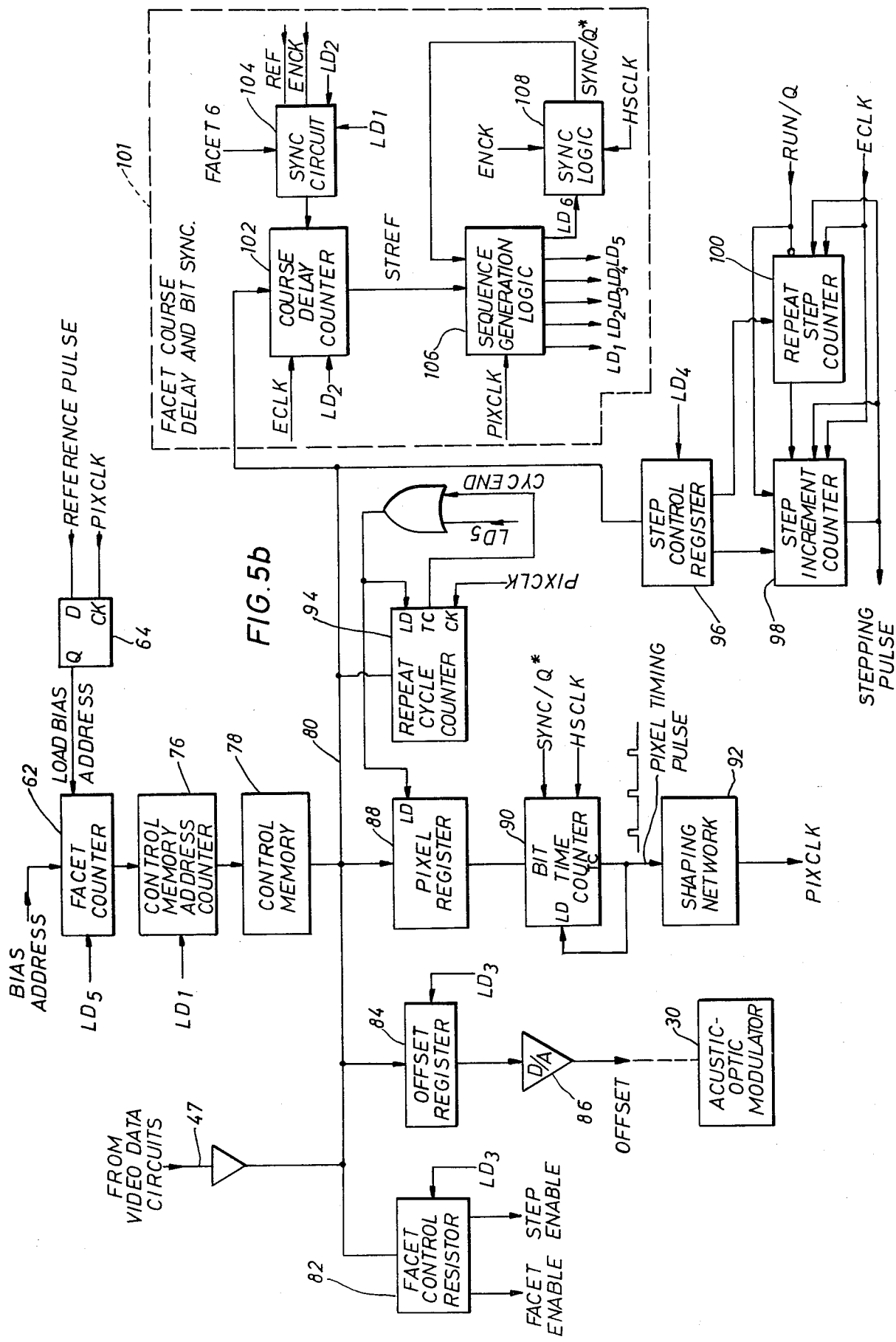
FIG. 5(b) is a block diagram of the timing circuits which produce the spot placement signals including compensation for the mirror errors.

Turning to FIG. 5(b), a block diagram of the timing circuits 44 (see FIG. 1) is shown. The timing signal ENCK and the REFERENCE PULSE from optical encoder 42 are applied to the timing circuits 44 to provide the system timing signals that eventually produce the pixel placement timing pulses and the stepping pulses to the stepping motors. Acting together, these timing pulses generate the desired plot resolution. During the generation of these timing pulses, predetermined control perameters are used to compensate for the facet-to-facet and the facet-to-axis errors to accurately position each scan line that is plotted.

The timing signal ENCK which is produced by optical encoder 42 has a predetermined number of clock cycles per revolution of the mirror. In the case of the preferred embodiment, the optical encoder produces 48,000 ENCK cycles per revolution or 8000 cycles per facet (scan angle interval). Once each revolution of the mirror, the optical encoder 42 produces a reference pulse when the angular position of the mirror is in the reference position. The angular position of the mirror in respect to the flat field image plane 18 when the mirror is in the reference position is not critical. However, this angular position of the mirror must be known so that the first start plot position for the first facet following the occurrence of the reference pulse can be accurately determined.

In the timing circuits 44, the signal ENCK is inverted to generate the signal ECLK* (see FIG. 6). Each cycle of this signal is divided into smaller time intervals by producing a phase-locked high-speed clock HSCLK from the signal ECLK*. As previously discussed with regard to FIG. 2, each facet sweeps the scan angle interval which is greater than the plot scan angle. For the preferred embodiment to achieve 500 pixels per inch resolution over the plot scan angle, the following number of ENCK cycles should occur as the mirror rotates through the scan angle interval (60 degrees rotation).

| | |
|---|---|
| No. of cycles/scan angle interval | = (resolution) × (plot scan length) × (scan angle/plot scan angle) |
| | = $(500)(42)(\frac{60}{26.25})$ |
| | = 48,000 cycles/scan angle interval |

Since the optical encoder 42 produces only 8000 cycles/scan angle, the signal ENCK must be multiplied by at least a factor of 6 in order to achieve the desired 500 lines per inch resolution. For added resolution, the multiplying factor should be greater than 6.

Referring to FIG. 5(a) which is a circuit diagram of a phase-locked loop frequency multiplier, the signal HSCLK is produced by multiplying ECLK by a predetermined number. In the case of the preferred embodiment, the signal ECLK* is multiplied by a factor of 96 to produce a frequency of 3.84 Mhz. Since HSCLK is phase-locked to the signal ECLK*, each cycle of the encoder timing signal ENCK is divided into 96 parts. It is from the HSCLK that a high degree of resolution of the angular position of the rotating mirror is possible.

As previously mentioned, high-resolution plotting must compensate for manufacturing tolerances in the rotating multi-facet mirror—the facet-to-facet and the facet-to-axis errors. These errors must be compensated for in order to place the pixels in their appropriate positions to achieve the desired resolutions.

Still referring to FIG. 5(b), prior to the start of each plot, a set of control parameters are loaded into control memory 78 from CPU 52 via the video data circuits 46 (see FIGS. 1 and 8). These control parameters specify the pixel placement spacing (the plot resolution); four control parameters will be used for each of the six facets of the rotating mirror to locate the start plot position for the next facet; whether each facet, once its start plot position has been located, will be used to plot a scan line; and the step increment to be applied to stepping motor 20 for advancing the film 16. The following TABLE 1 lists the contents of the control memory 78 along with the address of the memory location containing the control parameter. The memory 78 addresses are listed in hexa-decimal notation. Memory 78 is a 16×1024 bit random-access memory.

TABLE 1

| Address | Control Parameter |
|---|---|
| 000 | Pixel Placement |
| 3E8 | Facet 2 Coarse Delay |
| 3E9 | Facet 1 Control & Offset |
| 3EA | Facet 1 Step Increment |
| 3EB | Facet 1 Fine Delay |
| 3EC | Facet 3 Coarse Delay |
| 3ED | Facet 2 Control & Offset |
| 3EE | Facet 2 Step Increment |
| 3EF | Facet 2 Fine Delay |
| 3F0 | Facet 4 Coarse Delay |
| 3F1 | Facet 3 Control & Offset |
| 3F2 | Facet 3 Step Increment |
| 3F3 | Facet 3 Fine Delay |
| 3F4 | Facet 5 Coarse Delay |
| 3F5 | Facet 4 Control & Offset |
| 3F6 | Facet 4 Step Increment |
| 3F7 | Facet 4 Fine Delay |
| 3F8 | Facet 6 Coarse Delay |
| 3F9 | Facet 5 Control & Offset |
| 3FA | Facet 5 Step Increment |
| 3FB | Facet 5 Fine Delay |
| 3FC | Facet 1 Coarse Delay (measured from reference pulse) |
| 3FD | Facet 6 Control & Offset |
| 3FE | Facet 6 Step Increment |
| 3FF | Facet 6 Fine Delay |

As shown in FIG. 5(a), the frequency multiplier which produces HSCLK consists of a phase-locked loop 68 associated with binary counters 72 and 74 in a standard configuration for generating a higher frequency phase-locked digital signal from a reference. In this case, the reference is the signal ECLK*. The phase-locked loop is of standard design such as is a model NE564 manufactured by Signetics Corp., Again referring to FIG. 5(b), associated with control memory 78 is the control memory address counter 76 which provides the binary address to control memory 78 to output a control parameters onto control bus 80. Control memory address counter 76 consists of a binary counter which is loaded through its parallel inputs to an initial starting address from the output of facet counter 62. Each facet of the multi-facet rotating mirror is assigned a number, with each succeeding face one number higher. The facet counter 62 is used to count each facet as it scans a line across the film 16. This counter is loaded to an initial starting count, a bias address, corresponding to the memory 78 address for the first facet by pulsing the LOAD BIAS ADDRESS signal from flip-flop 64. The bias address loaded into facet counter 62 is associated with the first facet, FACET 1, following the occurrence of the reference pulse from optical encoder 42. In other words, for FACET 1, the bias address that is loaded into facet counter 62 corresponds to the control memory 78 memory address that contains the first of the four control parameters for that facet.

As each facet start plot position is located, the facet counter 62 is incremented. The output of facet counter 62 is applied to the parallel inputs of control memory address counter 76 such that each count in facet counter 62, when loaded into address counter 76, causes control memory address counter 76 to specify the starting address for the first of the four control parameters for the next facet.

Facet counter 62 continues to count up until it reaches the count corresponding to the last facet of the mirror. For the preferred embodiment, there are six mirror facets with the sixth facet designated by the signal FACET 6. This signal is applied to the sync circuit 104 shown in FIG. 5 to terminate the start plot position determination sequences until the next occurrence of the reference pulse from the optical encoder 42. This termination sequence is performed so that the start plot position determination for each of the facets for the next complete rotation of mirror 38 begins from the occurrence of the reference pulse. In this manner, errors in the start plot position determination of each facet will not accumulate more than one revolution since a re-synchronization occurs on each reference pulse. With the occurrence of each reference pulse, flip-flop 64 is enabled to permit a LOAD BIAS ADDRESS signal to occur and reset the bias address into facet counter 62. As previously mentioned, each count of facet counter 62 corresponds to every fourth control memory 78 address location.

Connected to the control data bus 80 are various registers and counters which respond to the control parameters to generate the pixel placement timing pulses (PIXCLK) and to compensate for the mirror errors.

Compensation for the Facet-to-Facet Errors

Still referring to FIG. 5(b), to compensate for the facet-to-facet errors, the timing circuits 44 operate as follows: During each scan across the image plane 18, pixel register 88 contains a number which specifies the pixel placement spacing. A discussion of how this number is loaded into register 88 is given below. The output of pixel register 88 is applied to the parallel inputs of bit time counter 90. Bit time counter 90 responds to the HSCLK clocking signal to sequence through its various counts. When the bit time counter 90 reaches its zero count, a pixel timing pulse is generated to shaping network 92. This timing pulse is also applied to its own LD input to reload into the counter the contents of pixel register 88. In this manner, bit time counter 90 will count down to zero at which time it will reload the pixel placement spacing control parameter and start the next pixel timing interval.

The pixal timing pulse generated by bit time counter 90 is a very narrow pulse. The function of shaping network 92 is to increase the duty cycle of the pixel timing pulse to produce the pixel clock PIXCLK. As previously discussed, each facet of the rotating mirror will assume an angular position relative to the flat field image plane 18, the start plot position, at which the reflected modulated laser beam 11 will be in a position to plot the first pixel for the next scan line. If the rotating mirror were perfectly constructed, the start plot position for the next facet would be a known angle of rotation away from the present plot start position. However, the start plot position for each facet is not necessarily equal to a fixed angular rotation of the mirror away from the last facet start plot position.

To locate the plot start position for each facet, the timing circuits 44 operate as follows: With the occurrence of the reference pulse from the optical encoder 42, a control parameter from control memory 78 is used to locate the plot start position for the next facet (FACET 1) to a coarse resolution. The coarse resolution determination of the start plot position for FACET 1 consists of counting a predetermined number of ENCK clocks from the occurrence of the reference pulse. At the completion of the predetermined count, a second control parameter from control memory 78 specifies the location of the plot start position to a high resolution and accuracy. The high resolution determination of the start plot position for FACET 1 consists of counting a predetermined number of HSCLK clock cycles. At the completion of the counting of the high resolution count, the plot start position for FACET 1 will have been located relative to the occurrence of the reference pulse.

When the plot start position for FACET 1 has been located, the coarse resolution determination of FACET 2, in relation to the plot start position for FACET 1, begins by loading the coarse delay control parameter into coarse delay counter 102. At the completion of this coarse determination cycle, the fine resolution determination will occur thus locating FACET 2 start plot position. This sequence continues from facet to facet until the facet counter 62 reaches a count which corresponds to FACET 6.

As previously discussed, when the signal FACET 6 occurs, the sync circuit 104 inhibits the coarse determination of the plot start position for the next facet, FACET 1, from occurring. The sync circuit 104 must await the next occurrence of the reference pulse from the optical encoder 42 before the coarse determination of the plot start position for FACET 1 can occur. Although the sync circuit 104 inhibits the coarse determination of FACET 1 until the next occurrence of the reference pulse, the necessary coarse determination control parameter will have been loaded into coarse delay counter 102 at the end of the course determination of FACET 6. Thus, for each revolution of the rotating mirror, the start plot position determinations are re-synchronized to the reference pulse.

The control parameters stored in control memory 78 which compensate for the facet-to-facet errors consist of binary counts. These binary counts are loaded into counters which respond to the encoder clock signal ENCK and the high-speed clock HSCLK. When the start plot position for a given facet has been determined, the course delay counter 102 is loaded with the control parameter from control memory 78 that corresponds to the number of ENCK clock cycles that will be counted from the present start plot position to the start plot position for the next facet. The coarse delay counter 102 responds to the signal ECLK which is the inverse of ENCK*. The binary count loaded into the course delay counter 102 is the binary compliment of the number of cycles of ECLK that are to be counted. The coarse delay counter 102 is counted up by each ECLK signal from the loaded value until it reaches its full scale count.

At the full scale count in course delay counter 102, the signal STREF is generated to the sequence generation logic 106. The sequence generation logic responding to PIXCLK and STREF generates a sequence of pulses, LD1-LD6, to strobe the various registers and counters of the timing circuits 44. Thus, the generation of the sequence signals LD1-LD6 occurs at the end of the coarse determination count for the start plot position for each facet. With the occurrence of the last of the sequence signals, LD6, the sync logic 108 is triggered to generate the signal SYNC/Q*. The signal SYNC/O* synchronizes the fine resolution determination sequence of the start plot position for the current facet to the leading edge of the next encoder clock cycle following the completion of the coarse determination sequence.

Figure 7:
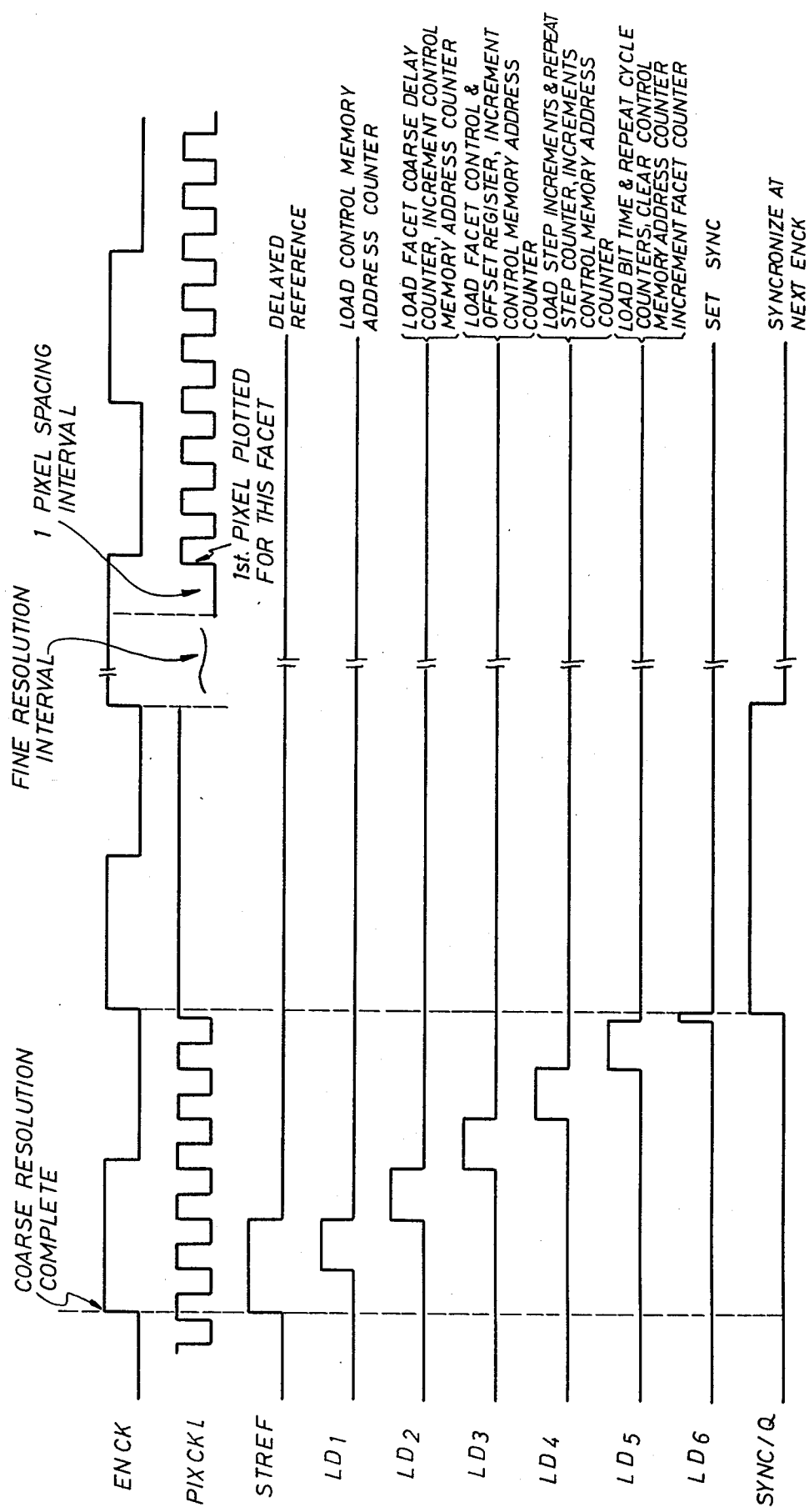
FIG. 7 is a timing diagram of the circuits illustrated in FIG. 6.

As shown in FIG. 5(b), the coarse delay counter 102, the sync circuit 104, the sequence generation logic 106 and the sync logic 108 comprise the facet coarse delay and bit sync circuits 101. Referring both to FIG. 7, which is a timing diagram of the facet coarse delay and bit sync circuits 101, and to FIG. 5, with the completion of the coarse determination of the start plot position for the current facet, the signal STREF from the coarse delay counter 102 goes true. Under control of PIXCLK, the sequence generation logic 106 sequentially generates the signals LD1-LD5 where each signal generated is true for one cycle of PIXCLK. Each of the sequence signals LD1-LD6 perform various functions within the timing circuits 44.

Referring now to FIGS. 6 and 7, the signal LD1 (FIG. 5(b)) loads the control memory address counter 76 with the contents of the facet counter 62. The contents of control memory address counter 76 now contains the control memory 78 address of the first memory location containing the first of the four control parameters for the current facet (see TABLE 1). The contents of control memory 78 specified by the contents of the control memory address counter 76 is then outputted to the control data bus 80. With the completion of sequence signal LD1, the signal LD2 goes true. The leading edge of LD2 loads the facet coarse delay counter 102 with the control parameter that is now present on bus 80 to specify the coarse determination of the next start plot position for the next facet. The signal LD2 also increments the control memory address counter 76 to address the next sequential memory location and produce the next control parameter onto bus 80.

At the termination of the signal LD2, the signal LD3 goes true. The leading edge of LD3 loads the facet control register 82 and the offset register 84 with the data that is now present on bus 80. A more thorough discussion of the function of these control parameters is provided below. At the completion of LD3, the control memory address counter 76 is incremented to produce the next control parameter on the control bus 80, and the signal LD4 goes true. The signal LD4 loads the step control register 96 with the control parameter present on the bus 80 to specify the number of stepping pulses that will be generated to the stepping motor 20 during this scan line. A discussion of the generation of the stepping pulses to the stepping motor 20 is provided in more detail below.

At the completion of LD4, the control memory address counter 76 is incremented to produce the next and last control parameter for the current facet onto the control bus 80. At the completion of the LD4, the signal LD5 goes true. The leading edge of LD5 loads the pixel register 88 and the repeat cycle counter 94 with the control parameters which specify the fine determination of the start plot position determination for the current facet. At the completion of LD5, the control memory address counter 76 is cleared to zero count (zero address location) and facet counter 62 is incremented. Contained in the control memory 78 at the zero address location is the control parameter which specifies the pixel placement spacing for the resolution selected for this plot. However, the pixel placement control parameter present on the control bus 80 will not be used until the fine resolution portion of the start plot position determination sequence for the current facet has been completed.

The signal CYCEND (see FIG. 5) is generated at the completion of the fine resolution determination cycle.

CYCEND loads the pixel register 88 and the repeat cycle counter 94 with the pixel placement separation control parameter present on the control bus 80. From this time on until the next occurrence of the signal LD5, generation of the pixel clock PIXCLK will be controlled by the pixel placement separation control parameter loaded into pixel register 88. At the completion of the signal LD5, the signal LD6 goes true.

Referring now to FIG. 6, flip-flops 130 and 132 are both in a logic 1 state for all times that LD6 is false. This is true because when SYNC/Q goes true (see FIG. 7), ECLK clocks flip-flop 130 into a logic 1 state. Since the Q* output of flip-flop 130 is tied to its preset input, the flip-flop will be preset to a logic one as long as LD6 acting through inverter 128 does not clear flip-flop 130 to a logic 0. Since flip-flop 130 is at a logic 1, flip-flop 132 is clocked to a logic 1 by HSCLK.

When the signal LD6 goes true, flip-flop 130 is cleared to a logic 0 causing flip-flop 132 to be clocked to a logic 0 on the next occurrence of a HSCLK. This causes the signal SYNC/Q* to go true and clear the sequence generation logic 106. When the sequence generation logic 106 is cleared, LD6 goes false. Flip-flop 130 is then enabled to respond to the next leading edge of the ECLK clock signal. This insures that the fine resolution determination sequence begins at the start of an encoder clock cycle since SYNC/Q* when true inhibits the bit time counter 99 from counting (see FIG. 5(b)).

As shown in FIG. 7, the fine resolution determination of the start plot position for the current facet begins two ECLK cycles after the completion of the coarse determination cycle. Depending upon the control parameters specified for the fine resolution determination for the current facet, the time interval between the trailing edge of the SYNC/Q and the first pixel placement pulse will vary. As previously discussed, when the fine resolution determination interval is over, the repeat cycle counter 94 (see FIG. 5(b)) generates the signal CYCEND to load the pixel register 88 and the repeat cycle counter 94 with the pixel placement control parameter. This control parameter corresponds to a predetermined number of HSCLK cycles that must occur between each pixel position timing pulse. Thus, the first pixel placement pulse for the scan line will occur according to the present pixel placement control parameter when the fine resolution determination of the start plot position for the current facet has been completed.

Thus, the facet-to-facet errors in mirror 38 which produce starting position errors in the scan lines can be compensated for by specifying a number of ENCK cycles and HSCLK cycles that must occur from the start plot position of one facet to the start plot position for the next facet. Since it is the angular rotation of the mirror that must be accurately determined in order to know when the next facet has rotated into the correct angular position to begin plotting a scan line, counting ENCK and HSLLK signals produces a measurement of the rotation and permits the determination.

To prevent angular resolution errors from accumulating over many revolutions of the mirror 38, the start plot determination sequence for the mirror facets is re-synchronized to the reference position each revolution of the mirror 38. This re-synchronization is accomplished by the sync circuits 104 consisting of flip-flops 114, 116, and 118, and inverters 110, 111, 112 and 120. Referring to FIG. 6, when the last facet signal FACET 6, outputted by facet counter 62 (see FIG. 5(b)), goes true (FACET 6 goes true at the end of the coarse determination of FACET 5) the sequence signal LD2*, which occurs at the end of the coarse determination for FACET 6, clocks flip-flop 114 to a logic 1 rather than clocking it from a logic 1 to a logic 0. Since the signal LD1*, which immediately preceeds LD2*, is used to preset flip-flop 114 to a logic 1 and to clear flip-flops 116 and 118 to logic 0's, for any facet other than FACET 6, flip-flop 114 is pre-set to a logic 1 by LD1* and then clocked to a logic 0 by LD2*.

After LD1* clears flip-flop 116, if FACET 6 is not true, then LD2* clocks flip-flop 114 to a logic 0 and the Q output presets flip-flop 116 to a logic 1. The Q output from flip-flop 116 provides the data input to flip-flop 118 which was also cleared by LD1*. If FACET 6 was not true at LD2 time flip-flop 118 will be clocked to a logic 1 by ECLK. The Q* output from flip-flop 118, when at a logic 1, disables the coarse delay counter 120 from counting. Thus, for each occurrence of LD1* the course delay counting is inhibited. However, if FACET 6 is not true, the inhibit is removed on the immediate next occurrence of LD2* and a leading edge of ECLK.

If FACET 6 is true, the inhibit to coarse delay counter 102 is not removed by the signal LD2* since flip-flop 114 will remain at a logic 1. In this manner, flip-flop 116 will remain at a logic 0 until the next occurrence of REFERENCE PULSE. When REFERENCE PULSE occurs, flip-flop 116 is clocked to a logic 1 which enables flip-flop 118 to be clocked to a logic 1 by the next leading edge of ECLK. Thus, the coarse delay determination of FACET 1 occurs from the occurrence of REFERENCE PULSE rather than from the start plot position of FACET 6. As a result, the start plot position determination of the facets is re-synchronized with the occurrence of the reference pulse once each revolution of the mirror 38.

Compensation for the Facet-to-Axis Errors

As previously discussed, the facet-to-axis error produces an error in the line-to-line spacing between consecutive scan lines. The timing circuits 44 compensate for the facet-to-axis errors in two ways. First, the number of stepping pulses applied to the stepping motor 20 (see FIG. 1) for each scan line is specified by one of the control parameters stored in control memory 78 (see FIG. 5(b) and TABLE 1). With the occurrence of the sequence signal LD4, the control parameter from control memory 78, which specifies the number of stepping pulses that will be applied to the stepping motor 20 during the current scan, is loaded into the step control register 96.

When the signal RUN/Q goes true (not inhibited by FACET ENABLE (see FIG. 5(b))), the contents of step control register 96 is loaded into step increment counter 98 and repeat step counter 100. These two counters, 98 and 100, respond to the clock signal ECLK to count down to zero. When the step increment counter 98 reaches a count of zero, a stepping pulse is generated to stepping motor 20 and the repeat cycle count is decremented. At the completion of the stepping pulse, counter 98 once again loads with the step increment value of the step control register 96 to begin the next interval count down, at the completion of which another stepping pulse is generated. This sequence continues during the entire scan angle interval or until the repeat cycle count reaches zero.

As is readily apparent, by appropriate selection of the step interval and repeat cycle count loaded into the step control register 96 and the generation of the signal RUN/Q, the generation of the sequence of stepping pulses needed to increment the film between consecutive scan lines may be controlled to produce the pulses in any sequence and number and at any time during one scan angle interval. For the preferred embodiment, the sequence of stepping pulses is generated evenly over the time required to scan the scan angle interval (see FIG. 2) so that the film appears to move continuously during plotting. The generation of the sequence and number of stepping pulses per scan provides the first order compensation correction for the facet-to-axis errors. For the preferred embodiment, normal step increments would be 200 steps for each line scan for 500 lines per inch plotting resolution.

The second method used to compensate for the facet-to-axis error is to apply a predetermined offset analog voltage to the acousto-optic modulator 30 to deflect the modulated beam in a direction to increase or decrease the line-to-line spacing between consecutive scan lines. This method applies a second order compensation correction for the line-to-line spacing. With the occurrence of the sequence signal LD3, the control parameter from control memory 78 which specifies the offset analog voltage (for the current mirror facet) to be applied to the acousto-optic modulator 30 (see TABLE 1) is strobed into the offset register 84. The digital contents of offset register 84 is converted to an analog voltage by D/A convertor 86 to produce the signal OFFSET (see FIG. 1). This signal is applied directly to the acousto-optic modulator 30.

Concurrently with the setting of the offset register 84 by the sequence signal LD3, a control parameter from control memory 78 is also strobed into facet control register 82. For purposes of testing each facet of the mirror, the output of facet control register 82 generates two signals, FACET ENABLE and STEP ENABLE. The signal FACET ENABLE, when true, permits the current facet to plot a scan line across the image plane. The signal STEP ENABLE, when true, permits the generation of the stepping pulses to the stepping motor 20. Thus, it is possible to control which of the facets are permitted to plot scan lines and to inhibit the advancement of a film 16 when a facet is not used.

An Alternate Embodiment For Mirror Error Compensation

According to another embodiment of the present invention, error compensation for the inherent mirror facet-to-facet and facet-to-axis errors to produce accurate scan line positioning may be accomplished by the use of an optical detector 2 positioned between the start of the scan angle interval and the start of the plot scan angle interval (see FIGS. 1 and 2). The optical sensor or laser beam detector 2 could typically be one such as those manufactured by United Detector Technology in which the sensor's active region is divided into quadrants. These type of detectors with the use of special electronics can produce signals which indicate the location of the beam relative to the center of the sensor. In other words, if the center of the sensor is located on the scan line, as the beam is swept across the sensor, the presence of the beam and its displacement from the desired location of the scan line can automatically be located.

For the preferred embodiment, the angular position of the rotating mirror 38 has to be accurately measured to determine when the reflected laser beam 11 is located at the start plot position of the scan line. With the use of the sensor, the position of the beam is detected ahead of the start plot position. The angular rotation of the mirror can then be measured for some fixed amount corresponding to the distance from the sensor's location to the start plot position. With this arrangement, there is only one count delay control parameter needed to locate the start plot position of each facet to thereby compensate for the facet-to-facet errors.

To compensate for the facet-to-axis errors, the displacement of the beam from the center of the sensor 2 can be used to automatically compensate for these facet errors by producing feedback error signals proportional to the displacement error to either produce an appropriate change in the number of micro-incremental steps applied to the film when this facet is being used, or to produce an offset voltage to the acousto-optic modulator or some appropriate beam deflector mechanism to deflect the beam in the direction to reduce the displacement error. This feedback error correction dynamically compensates for these mirror errors based on the displacement error present each time the facet scans a line. In other words, the correction factor for the displacement error for one scan would be remembered and applied to the next scan for that same facet. At this next scan, a new correction factor would be determined and applied to the next suceeding scan for that facet, and so on. In this manner, each scan may or may not need further correction, but if it does require a change due to such things as temperature variations, mirror spin instability, etc., one can be dynamically applied.

It is obvious to a person of ordinary skill in this art that variations on the concept of mirror error compensation just described are possible, such as locating the sensor 2 at the end of the scan line and use the sensor only to compensate for facet-to-axis errors, using only a single quadrant sensor to detect the beam to compensate only for facet-to-facet errors, etc.

Although the preferred embodiment discloses the use of a flat filed scan lens to both compensate for the non-linear beam velocity across the image plane, and to produce a diffraction limited constant spot size on the image plane, the means to control the beam could be something other than a flat field scan lens. For example, a fixed or moveable reflecting mirror could be positioned between the rotating scanner and the image plane such that the distance from the scanner to the image plane measured along the path of the laser beam is constant. As a result, the spot size will remain constant across the image plane. If in addition to the mirror, a beam deflector were positioned in the path of the beam, a control voltage could be applied to the deflector to deflect the beam in a direction to compensate for the beam's non-linear velocity across the image plane.

THE VIDEO DATA CIRCUITS

Referring now to FIG. 8, which illustrates a block diagram of the video data circuit 46 connected to the system controller 48 and the CPU 52, plot data from the CPU 52 is applied to the plotter through the CPU interface control circuits 50. Also connected to CPU interface control 50 is the system controller 48 which generates the signals necessary to communicate with the CPU and to control the flow of the plot data through the video data circuits 46. Prior to the start of a plot, the contents of the control memory 78 (see FIG. 5) is transferred from the CPU 52 to the control memory 78 through the video data circuits 46. The system controller 48 illustrated in FIG. 8 could be a microprocessor. In the case of the preferred embodiment, the system controller 48 is a microprogrammed controller whose various states control the flow of data.

Still referring to FIG. 8, the plot data from CPU 52 is strobed into the MDR REGISTER 134. The contents of the MDR REGISTER 134 is applied to the input of a first-in first-out shift register (FIFO) 136. Because the data that is plotted will not be synchronized to the outputting of the plot data by the CPU 52, a FIFO shift register is used to control the flow of data from the CPU to the plotter. It is obvious to a person of ordinary skill in the art that there are other ways in which the plot data may be supplied from the CPU 52 to the plotter, such as request-response, DMA interrupt, etc.

The output of the FIFO 136 is supplied to REGISTER A 138. The output of REGISTER A 138 is applied to the DE-MUX 140 and to the databus 47. The data applied to databus 47 is routed to the control bus 80 (see FIG. 5(b)). It is over this bus that the control parameter data from CPU 52 to control memory 78 is sent.

The plot data applied to the DE-MUX 140 is a 16-bit data word which specifies the intensity of the plotted pixels. For the present invention, there are three ways in which the pixel intensity may be specified. First, a "Raster Dot Image" selection specifies that the plotted pixel will have one of two plot intensities, either "on" at some intensity of "off" completely. For such a case, only one binary bit is required for each pixel. Therefore, for this selection, each 16-bit word applied to DE-MUX 140 specifies 16 pixels to be plotted. Second, a "Raster Pixel Image" selection specifies that each plotted pixel will be represented by four bits (one of 16 possible intensity levels for the plotted pixel). Thus, each 16-bit data word in REGISTER A 138 will specify four pixels to be plotted. Third, a "Raster Density Image" selection specifies that each plotted pixel will be represented by eight bits (one of 256 intensity levels for each plotted pixel). Thus, for this selection, each 16-bit word contained in a REGISTER A 138 will specify two pixels to be plotted.

The output of DE-MUX 140 is applied to REGISTER B 142 and, via inverter 146, to the I/O input of the GAMMA LOOK-UP TABLE 144. GAMMA TABLE 144 consists of a random access memory having 256 8-bit memory locations. The function of the GAMMA LOOK-UP TABLE 144 is to linearize the GAMMA DENSITY curve for the light-sensitive film 16. Referring to FIG. 4, a typical S-shaped gamma density curve in which the film density is plotted against the digital intensity value for an 8-bit digital word is shown. Superimposed on the curve is the resulting linear curve produced from the recorded data in the memory. Thus, the GAMMA LOOK-UP TABLE 144 may be programmed with the appropriate density values to linearize the gamma density curve over the intensity range and the resolution selected for the plot.

The output of REGISTER B 142 forms the address for the GAMMA LOOK-UP TABLE 144. The data outputted by the GAMMA LOOK-UP TABLE 144 is applied to the input of REGISTER C 148. The digital value stored in REGISTER C 148 is applied to D/A convertor 149 to produce the VIDEO CONTROL analog voltage signal that is applied to the acousto-optic modulator 30 (see FIG. 1). The signal VIDEO CONTROL controls the intensity of the laser beam as it passes through the acousto-optic modulator 30. In the preferred embodiment, it is possible to achieve a possible 1 of 256 possible intensity levels for the plotted pixels.

THE PLOTTER IN OPERATION

In operation, the CPU 52 loads the GAMMA LOOK-UP TABLE 144 and the control memory 78 with the data necessary to compensate for the mirror errors and to generate a plot at a selected resolution. After a plot sequence is initiated, the plot data is transferred from the CPU 52 to the video data circuits 46 of the plotter. Responsive to the pixel placement timing signal PIXCLK, the system controller 48 controls the video data circuits 46 to generate the VIDEO CONTROL analog voltage to the acousto-optic modulator 30. This signal modulates a laser beam to produce the variable intensity pixel on the light-sensitive film 16. Synchronized to the rotation of the multi-facet mirror 38 and responsive to the mirror error compensation control parameters the timing circuits 44 generate the pixel placement timing pulses PIXCLK that enables the plot data to be applied to the acousto-optic modulator 30, and to generate the stepping pulses to the stepping motor 20 to advance the film 16 during each plot scan. As each facet reflects the modulated laser beam 11 across the image plane 18, a flat field scan lens 36 compensates both for the nonlinear velocity of the beam across the image plane, and also adjusts the focus point of the modulated laser beam 18 to plot a pixel that is both constant in size, and diffraction limited.

Further modifications and alternative emmbodiments of the apparatus of this invention will be apparent to those skilled in the art in view of this description. Accordingly, this description is to be construed as illustrative only and is for the purpose of teaching those skilled in the art the manner of carrying out the invention. It is to be understood that the forms of the invention herewith shown and described are to be taken as the presently preferred embodiments. Various changes may be made in the shape, size and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. A high-resolution graphics plotter for plotting data on a recording medium as selectively positioned spots of variable intensity, the plotter comprising:
   (a) a collimated light source, for providing a beam of light, the light beam having a diameter;
   (b) a light intensity modulator responsive to the data, for modulating the intensity of the light beam;
   (c) a light-sensitive film positionable in a flat field image plane for exposure by the modulated light beam;
   (d) a rotatable multi-facet mirror, for scanning along a line the modulated light beam across the image plane of said film, said mirror having facet-to-facet and facet-to-axis errors, each facet of said mirror rotated into a start plot position relative to said film, at which position plotting of the scan line begins;
   (e) a light beam control means positioned between said mirror and the image plane, for providing compensation for the non-linear velocity of the modulated light beam as it is scanned across the image plane; and (f) a spot positioning means responsive to the rotation of said mirror, for compensating for the facet-to-facet and facet-to-axis errors, and for generating a spot placement signal which cooperates with the data to produce the selectively positioned variable intensity spots.

2. The plotter of claim 1 wherein said light intensity modulator is an acousto-optic modulator.

3. The plotter of claim 1 wherein said light beam control means comprises a flat field scan lens.

4. The plotter of claim 1 wherein said spot positioning means comprises:
 (a) a velocity sensitive tachometer connected to said rotating mirror, for producing a reference signal for each revolution of said rotating mirror, and a timing signal whose frequency is proportional to the angular velocity of said mirror;
 (b) an error correcting means responsive to the tachometer timing and reference signals, for providing compensation for the rotating mirror facet-to-facet and facet-to-axis errors; and
 (c) film advancing means for advancing said light-sensitive film across the image plane.

5. The plotter of claim 4 wherein said velocity sensitive tachometer is an incremental optical encoder, said encoder having a reference position at which the reference signal is generated.

6. The plotter of claim 2 wherein said film position means comprises:
 (a) a stepping motor responsive to said error correcting means, for advancing said light-sensitive film in incremental steps across the image plane; and
 (b) a zero-backlash gear reducer interconnected with said stepping motor and said film, said stepping motor and said gear reducer cooperating to advance the film in incremental steps substantially smaller than the line-to-line spacing between consecutive scan lines.

7. The plotter of claim 2 wherein said error correcting means comprises:
 (a) a frequency multiplier responsive to the timing signal for producing a high-speed clock signal that is phase locked to the timing signal;
 (b) a control memory for storing control parameters, the parameters specifying the spot placement interval and the compensation for the rotating mirror facet-to-facet and facet-to-axis errors;
 (c) a facet counter for counting each facet, the contents of said facet counter corresponding to a control memory address;
 (d) a control memory address counter responsive to said facet counter contents, for generating the memory address to said control memory;
 (e) means responsive to the facet-to-facet error compensation control parameters and the spot interval control parameter, for accurately locating the start plot position for each facet of said rotating mirror and for generating the spot placement signal, respectively; and
 (f) means responsive to the facet-to-axis error compensation facet control parameters, for producing constant line-to-line spacing between consecutive scan lines.

8. The plotter of claim 4 wherein said facet start plot position locating means comprises:

(a) a coarse delay counter responsive to the timing signal, for measuring with a coarse resolution the angular rotation of said rotating mirror; and
(b) a fine delay counter responsive to the high speed clock, for
 (i) measuring with a high resolution at the completion of the coarse resolution measurement the angular rotation of said rotating mirror, said coarse and fine counters cooperating to accurately locate the start plot position of each facet, and
 (ii) generating a spot placement pulse at the completion of every spot placement interval.

9. The plotter of claim 7 wherein said line-to-line spacing means comprises:
 (a) a step increment counter responsive to the timing signal, for producing a predetermined sequence and number of step increment pulses to said stepping motor whereby said film is advanced during a scan; and
 (b) offset means for deflecting the light beam in a direction to increase or decrease the line-to-line spacing between consecutive scan lines.

10. The plotter of claim 1 further comprising:
 (a) an optical focusing unit, for focusing and reducing the beam diameter applied to said light intensity modulator;
 (b) a collimating optical unit, for re-collimating the focused and modulated light beam exiting from said light intensity modulator; and
 (c) a focus expander, for expanding the beam diameter of the modulated light beam, said focus expander and said light beam control means cooperating to produce a predetermined spot size on the image plane.

11. The plotter of claims 1 or 10 wherein said collimated light source is a laser.

12. In a laser photodot plotter for plotting data in the form of selectively positioned spots of variable intensity, the plotter having,
 (A) a laser light source, for providing a collimated laser light beam, said beam having a diameter,
 (B) a light intensity modulator responsive to the plotting data, for modulating the intensity of the laser beam,
 (C) a light-sensitive film position in a flat field image plane for exposure by said modulated laser beam,
 (D) a rotatable multi-facet mirror for scanning along a line the modulated laser beam across the image plane of said film, the velocity of the beam varying non-linearly across the image plane, said mirror having facet-to-facet and facet-to-axis errors, each facet of said mirror rotated into a start plot position relative to said film, at which position plotting of a scan line begins,
 (E) optical means for focusing and directing the laser beam onto said rotating mirror, and
 (F) spot spacing means responsive to the rotation of said mirror for generating a spot placement signal, said spacing means generating a timing signal proportional to the angular velocity of said rotating mirror and a reference position signal for each revolution of said mirror, said timing signal producing a high-speed clock signal, said placement signal and the data cooperating to produce the selectively positioned variable intensity spots,
the improvement comprising:

(a) stepping means responsive to the application of a predetermined sequence and number of incremental step advancement pulses for advancing said film across the image plane; and (b) error correcting means for
  (1) correcting for the non-linear flat field beam velocity and the plotted spot size as the modulated laser beam is swept across the image plane,
  (2) correcting for the facet-to-facet errors of said mirror by accurately determining when each facet of said mirror is in its start plot position, and
  (3) correcting for the facet-to-axis errors of said mirror by
    (i) deflecting the laser beam in a direction to increase or decrease the line-to-line spacing between consecutive scan lines and/or
    (ii) controlling said stepping means to increase or decrease the number of incremental step advancement pulses applied to said film.

13. The plotter of claim 12 wherein said stepping means comprises:
  (a) a stepping motor responsive to said error correcting means for advancing said light-sensitive film in incremental steps across the image plane; and
  (b) a zero-backlash gear reducer interconnected with said stepping motor and said film, said stepping motor and said gear reducer cooperating to advance the film in incremental steps which are substantially smaller than the line-to-line spacing between consecutive scan lines.

14. The plotter of claim 12 wherein said light intensity modulator is an acousto-optic modulator.

15. The plotter of claim 12 wherein said optical means comprises:
  (a) an optical focusing unit, for focusing and reducing the beam diameter applied to said light intensity modulator;
  (b) a collimating optical unit, for re-collimating the focused and modulated light beam from said light intensity modulator; and
  (c) a focus expander, for expanding the beam diameter of the modulated light beam, said focus expander and said error correcting means cooperating to produce a predetermined and constant spot size on the image plane.

16. The plotter of claim 12 wherein said spot spacing means comprises:
  (a) a velocity sensitive tachometer connected to said rotating mirror for producing a reference signal for each revolution of said rotating mirror, and a timing signal whose frequency is proportional to the angular velocity of said rotating mirror;
  (b) a frequency multiplier responsive to the timing signal for producing a high-speed clock signal that is phase-locked to the timing signal; and
  (c) a counter responsive to the high-speed clock and a predetermined count, for generating the spot placement signal which cooperates with the data to produce the selectively positioned variable intensity spots.

17. The plotter of claim 12 wherein said velocity sensitive tachometer is an incremental optical encoder.

18. The plotter of claim 12 wherein the error correcting means comprises:
  (a) a light beam control means positioned between said rotating mirror and the image plane, for correcting for the non-linearity in the beam velocity and plotted spot size as the modulated beam is scanned across the image plane;
  (b) an optical sensor positioned in the image plane, for detecting the modulated beam as it is scanned across the image plane, and sensor output signals enabling the location of the start plot position of each facet, and/or enabling the accurate spacing of each scan line by
    (i) deflecting the modulate laser beam in a direction to increase or decrease the line-to-line spacing between consecutive scan lines, and/or
    (ii) controlling said stepping means to increase or decrease the number of incremental step advancement pulses applied to said film.

19. The plotter of claim 18 wherein the light beam control means comprises a flat field scan lens.

20. The plotter of claim 12 wherein the error correcting means comprises:
  (a) a light beam control means positioned between said rotating mirror and the image plane, for correcting for the non-linearity in the beam velocity and plotted spot size as the modulated beam is scanned across the image plane;
  (b) a control memory for storing control parameters, the parameters specifying the spot placement interval and the compensation for the rotating mirror facet-to-facet and facet-to-axis errors;
  (c) a facet counter for counting each facet, the contents of said facet counter corresponding to a control memory address;
  (d) a control memory address counter responsive to said facet counter, for generating the memory address to said control memory;
  (e) means responsive to the facet-to-facet error compensation control perameters and the spot interval control perameter for accurately locating the start plot position for each facet of said rotating mirror and for generating the spot placement signal, respectively; and
  (f) means responsive to the facet-to-axis error compensation facet control perameters, for controlling the line-to-line spacing between consecutive scan lines.

21. The plotter of claim 20 wherein the light beam control means comprises a flat field scan lens.

22. The plotter of claim 20 wherein said facet start plot position locating means comprises:
  (a) coarse delay counter responsive to the timing signal, for measuring with a coarse resolution the angular rotation of said rotating mirror; and
  (b) a fine delay counter responsive to the high-speed clock, for
    (i) measuring with a high resolution at the completion of the coarse resolution measurement the angular rotation of said rotating mirror, said coarse and fine counters cooperating to accurately locate the start plot position of each facet, and
    (ii) generating a spot placement pulse at the completion of every spot placement interval.

23. The plotter of claim 20 wherein said line-to-line spacing controlling means comprises:
  (a) a step increment counter responsive to the timing signal, for producing a predetermined sequence and number of step increment pulses to said stepping means whereby said film is advanced during a scan; and (b) offset means for deflecting the light beam in a direction to increase or decrease the line-to-line spacing between consecutive scan lines.

24. A high-resolution graphics plotter for plotting data on a recording medium as selectively positioned spots of variable intensity, the plotter comprising:
   (a) a collimated light source, for providing a beam of light, the light beam having a diameter;
   (b) a light intensity modulator responsive to the data, for modulating the intensity of the light beam;
   (c) a light-sensitive film positionable in an image plane for exposure by the modulated light beam;
   (d) a rotatable multi-facet mirror, for scanning the modulated light beam along a line across the image plane of said film, said mirror having facet-to-facet and facet-to-axis errors, each facet of said mirror rotated into a start plot position relative to said film, at which position plotting of the scan line begins; and
   (e) a spot positioning means responsive to the rotation of said mirror, for producing accurate scan line positioning by
      (i) compensating for the facet-to-facet errors by detecting the start plot position for each facet of said mirror, and
      (ii) compensating for the facet-to-axis errors by,
         (1) controlling the position of the film in the image plane between the start of successive scan lines, and/or
         (2) generating a deflection control signal to said light intensity modulator to deflect said beam in a direction to affect the line-to-line spacing at the image plane, and
      for generating a spot placement signal which cooperates with the data to produce the selectively positioned variable intensity spots.

25. The plotter of claim 27 wherein said velocity sensitive tachometer is an incremental optical encoder, said encoder having a reference position at which the reference signal is generated.

26. The plotter of claim 24 wherein said light intensity modulator is an acousto-optic modulator.

27. The plotter of claim 24 wherein said spot positioning means comprises:
   (a) a velocity sensitive tachometer connected to said rotating mirror, for producing a reference signal for each revolution of said rotating mirror, and a timing signal whose frequency is proportional to the angular velocity of said mirror;
   (b) an error correcting means responsive to the tachometer timing and reference signals, for providing the facet-to-facet and facet-to-axis error compensation; and
   (c) film advancing means for advancing said light-sensitive film across the image plane.

28. The plotter of claim 24 wherein said film advancing means comprises:
   (a) a stepping motor responsive to said error correcting means, for advancing said light-sensitive film in incremental steps across the image plane; and
   (b) a zero-backlash gear reducer interconnected with said stepping motor and said film, said stepping motor and said gear reducer cooperating to advance the film in incremental steps substantially smaller than the line-to-line spacing between consecutive scan lines.

29. The plotter of claim 27 wherein said error correcting means comprises:
   (a) a frequency multiplier responsive to the timing signal for producing a high-speed clock signal that is phase locked to the timing signal;
   (b) a control memory for storing control parameters, the parameters specifying the spot placement interval and the compensation for the rotating mirror facet-to-facet and facet-to-axis errors;
   (c) a facet counter for counting each facet, the contents of said facet counter corresponding to a control memory address;
   (d) a control memory address counter responsive to said facet counter contents, for generating the memory address to said control memory;
   (e) responsive to the facet-to-facet error compensation control parameters and the spot interval parameter, for accurately locating the start plot position for each facet of said rotating mirror and for generating the spot placement signal, respectively; and
   (f) means responsive to the facet-to-axis error compensation facet control parameters, for producing constant line-to-line spacing between consecutive scan lines by
      (i) controlling said film advancing means between the start of successive scan lines, and/or
      (ii) generating a control signal to said light intensity modulator to deflect said light source in a direction to affect the line-to-line spacing.

30. The plotter of claim 29 wherein said facet start plot position locating means comprises:
   (a) a course delay counter responsive to the timing signal, for measuring with a coarse resolution the angular rotation of said rotating mirror; and
   (b) a fine delay counter responsive to the high speed clock, for
      (i) measuring with a high resolution at the completion of the coarse resolution measurement the angular rotation of said rotating mirror, said coarse and fine counters cooperating to accurately locate the start plot position of each facet, and
      (ii) generating a spot placement pulse at the completion of every spot placement interval.

31. The plotter of claim 29 wherein said line-to-line spacing means comprises:
   (a) a step increment counter responsive to the timing signal, for producing a predetermined sequence and number of step increment pulses to said stepping motor whereby said film is advanced during a scan; and
   (b) offset means for deflecting the light beam in a direction to increase or decrease the line-to-line spacing between consecutive scan lines.

32. The plotter of claim 24 further comprising:
   (a) an optical focusing unit, for focusing and reducing the beam diameter applied to said light intensity modulator;
   (b) a collimating optical unit, for re-collimating the focused and modulated light beam exiting from said light intensity modulator; and
   (c) a focus expander, for expanding the beam diameter of the modulated light beam to produce a predetermined spot size on the image plane.

33. The plotter of claims 24 or 32 wherein said collimated light source is a laser.

34. The method of producing high-resolution, large format laserdot plots consisting of selective positioned variable intensity spots on light-sensitive film positioned for exposure in a flat field image plane, the method comprising the steps of:
- (a) modulating the intensity of a collimated light beam in response to plot data;
- (b) applying the modulated light beam to a rotating multi-facet mirror so that each facet of the mirror scans the modulated light beam along a line across the image plane, each facet rotated into an angular position relative to the image plane at which the plotting of a scan line begins, said mirror having facet-to-facet and facet-to-axis errors;
- (c) compensating for both the plotted spot size and the non-linear beam velocity as the modulated beam is scanned across the image plane;
- (d) generating a signal which deflects the modulated high beam in a direction to increase or decrease the line-to-line spacing between consecutive scan lines;
- (e) generating a predetermined number and sequence of stepping pulses which control the advancement of the film across the image plane, steps (d) and (e) cooperating to compensate for the mirror facet-to-axis errors; and
- (f) measuring the angular position of the rotating mirror
  - (i) to determine the start plot position of each facet thereby compensating for the mirror facet-to-facet errors, and
  - (ii) to generate a spot placement signal which cooperates with the data to produce the selectively positioned variable intensity spots.

35. The method of claim 34 wherein the step of generating the stepping pulses is performed such that the predetermined number of stepping pulses is applied evenly and continuously over the scan angle interval.

36. The method of claim 34 wherein the step of measuring the angular position of the rotating mirror comprises the steps of:
- (a) generating a timing signal whose frequency is proportional to the angular velocity of the rotating mirror and whose total number of cycles for each revolution of the rotating mirror is constant;
- (b) generating a reference position signal for each revolution of the mirror;
- (c) increasing the frequency of the timing signal to produce a high-speed clock whose phase is locked to the phase of the timing signal; and
- (d) counting a predetermined number of timing signal cycles and high-speed clock cycles relative to the occurrence of the reference position signal.

37. The method of claim 36 wherein the step of locating the start plot position of each facet comprises the steps of:
- (a) counting each facet, where each facet is assigned a number;
- (b) counting a predetermined number of timing signal cycles from the start plot position of the previous facet to locate with a coarse resolution the start plot position of the next facet;
- (c) counting a predetermined number of high-speed clocks following the completion of step (b) to locate with a high resolution the start plot position of the facet;
- (d) inhibiting the performance of step (b) when the last facet start plot position has been located; and
- (e) re-synchronizing the locating of the start plot position of the first facet to the rotation of the mirror by permitting step (b) to be performed from the occurrence of the reference signal rather than from the start plot position of the last facet.

* * * * *

UNITED STATES PATENT AND TRADEMARK OFFICE
CERTIFICATE OF CORRECTION

PATENT NO. : 4,257,053
DATED : March 17, 1981
INVENTOR(S) : Cecil R. Gilbreath

It is certified that error appears in the above-identified patent and that said Letters Patent are hereby corrected as shown below:

Column 2, line 29 "the depth o" should read --the depth of--

Column 3, line 5 "normal to the sping" should read --normal to the spin--

Column 21, line 31 "The plotter of claim 2" should read --The plotter of claim 4--
Column 21, line 42 "The plotter of claim 2" should read --The plotter of claim 4--
Column 21, line 67 "The plotter of claim 4" should read --The plotter of claim 7--

Column 24, line 45 "The plotter of claim 20" should read --The plotter of claim 18--

Column 25, line 56 "The plotter of claim 24" should read --The plotter of claim 27

Column 26, line 14 "(e) responsive to" should read --(e) means responsive to--

Signed and Sealed this

Tenth Day of November 1981

[SEAL]

Attest:

Attesting Officer

GERALD J. MOSSINGHOFF

Commissioner of Patents and Trademarks